US009144844B2

(12) United States Patent
Pohl et al.

(10) Patent No.: US 9,144,844 B2
(45) Date of Patent: Sep. 29, 2015

(54) SINTERED COMPOSITE AND METHOD FOR ITS MANUFACTURE

(75) Inventors: Angelika Pohl, Stuttgart (DE); Alfred Boelstler, Westhausen (DE)

(73) Assignee: SCHWABISCHE HUTTENWERKE AUTOMOTIVE GMBH, Aalen-Wasseralfingen (DE)

( * ) Notice: Subject to any disclaimer, the term of this patent is extended or adjusted under 35 U.S.C. 154(b) by 948 days.

(21) Appl. No.: 13/196,971

(22) Filed: Aug. 3, 2011

(65) Prior Publication Data
US 2012/0037104 A1 Feb. 16, 2012

(30) Foreign Application Priority Data

Aug. 11, 2010 (DE) .......................... 10 2010 034 014

(51) Int. Cl.
| | |
|---|---|
| B22F 7/08 | (2006.01) |
| B22F 5/08 | (2006.01) |
| B23F 1/00 | (2006.01) |
| C22C 21/02 | (2006.01) |
| C22C 21/10 | (2006.01) |
| C22C 21/14 | (2006.01) |
| C22C 21/16 | (2006.01) |
| F16D 1/00 | (2006.01) |
| F16H 7/00 | (2006.01) |
| F16H 55/06 | (2006.01) |
| B22F 7/06 | (2006.01) |
| B23P 15/14 | (2006.01) |

(Continued)

(52) U.S. Cl.
CPC ... *B22F 7/08* (2013.01); *B22F 5/08* (2013.01); *B22F 7/062* (2013.01); *B23F 1/00* (2013.01); *B23P 15/14* (2013.01); *C22C 21/02* (2013.01); *C22C 21/10* (2013.01); *C22C 21/14* (2013.01); *C22C 21/16* (2013.01); *F16D 1/00* (2013.01); *F16H 7/00* (2013.01); *F16H 55/06* (2013.01); *B22F 3/1021* (2013.01); *B22F 2999/00* (2013.01); *C22C 1/0416* (2013.01)

(58) Field of Classification Search
None
See application file for complete search history.

(56) References Cited

U.S. PATENT DOCUMENTS

| | | | | |
|---|---|---|---|---|
| 4,583,502 | A | 4/1986 | Takahashi | |
| 6,412,462 | B1 * | 7/2002 | Lichti et al. ................ | 123/90.17 |
| 6,843,215 | B2 * | 1/2005 | Hiratsuka et al. .......... | 123/90.17 |

(Continued)

FOREIGN PATENT DOCUMENTS

| | | |
|---|---|---|
| DE | 3007008 C2 | 8/1980 |
| DE | 19752380 | 6/1998 |

(Continued)

OTHER PUBLICATIONS

German Office Action dated Apr. 6, 2011.

*Primary Examiner* — George Wyszomierski
*Assistant Examiner* — Ngoclan T Mai
(74) *Attorney, Agent, or Firm* — RatnerPrestia

(57) ABSTRACT

A method for powder-metallurgically manufacturing a rotational body, including compacting a first starting body is compacted from a metal powder; forming a second starting body from metal, separately from the first starting body; placing the starting bodies against each other in axial contact via end faces in relation to a longitudinal axis of the rotational body; and permanently and firmly sintered the first starting body and the second starting body to each other by collective sintering. The first starting body is compacted from an aluminum-based powder, the second starting body is formed from an aluminum material, and the starting bodies are sintered to each other at their respective end faces.

17 Claims, 6 Drawing Sheets

(51) Int. Cl.
*B22F 3/10* (2006.01)
*C22C 1/04* (2006.01)

(56) References Cited

U.S. PATENT DOCUMENTS

| | | | | |
|---|---|---|---|---|
| 7,497,193 | B2 * | 3/2009 | Knecht et al. | 123/90.17 |
| 2003/0070639 | A1 * | 4/2003 | Kohrs | 123/90.17 |
| 2003/0202897 | A1 * | 10/2003 | Clark et al. | 419/6 |
| 2004/0208772 | A1 * | 10/2004 | Eiberger et al. | 419/10 |
| 2008/0232996 | A1 * | 9/2008 | Federzoni et al. | 419/36 |
| 2008/0283010 | A1 | 11/2008 | Bohner | |
| 2009/0000303 | A1 * | 1/2009 | Patel et al. | 60/752 |
| 2011/0126785 | A1 | 6/2011 | Terfloth | |

FOREIGN PATENT DOCUMENTS

| | | |
|---|---|---|
| DE | 10331631 B3 | 1/2005 |
| DE | 102007020431 A1 | 10/2008 |
| DE | 102008028640 A1 | 12/2009 |
| DE | 102009024482 A1 | 12/2010 |
| EP | 1923155 A1 | 5/2008 |

* cited by examiner

SINTERED COMPOSITE AND METHOD FOR ITS MANUFACTURE

FIELD OF THE INVENTION

The invention relates to: a method for manufacturing a rotational body by incorporating powder-metallurgical processes; a sintered composite; and the use of the sintered composite in a swing-wing adjuster for adjusting the rotational angular position of a valve control shaft relative to a crankshaft of an internal combustion engine. The method is in particular suitable for manufacturing the sintered composite.

BACKGROUND OF THE INVENTION

Components exhibiting a complex geometry can also be manufactured powder-metallurgically if the components are assembled from separately compacted starting bodies and the starting bodies are permanently and firmly connected to each other in a material fit by collective sintering. A process for manufacturing composite-sintered machine components is for example known from EP 1 923 155 B1, in which a cylindrical inner member and a disc-shaped outer member are each individually compacted from an iron-based alloy powder and are sintered to each other to form a firm composite. The cylindrical inner member is formed with pillars which protrude axially into holes in the disc-shaped outer member. The pillars, when being compacted, are formed with a radial excess such that they protrude into the respective hole in a press fit and are thus firmly connected to the disc-shaped outer member across their circumferential areas when the two are collectively sintered. Comparable teachings are contained in DE 197 52 380 A1 and DE 10 2008 028 640 A1, which likewise describe the composite-sintering of compacts which are separately formed from an iron-based alloy powder. In accordance with this prior art, too, assembling the compacts in a radial press fit is also a precondition for creating the sintered composite. Compacting the starting bodies and/or compacting them in a press fit presupposes that the starting bodies are formed to an exact and narrow tolerance. Positioning the compacts which are to be sintered to each other in the respective press fit also incurs expense and takes time.

SUMMARY OF THE INVENTION

It is an aspect of the invention to simplify the manufacture of a sintered composite from separately formed starting bodies and to thus contribute to reducing the manufacturing costs. The invention proceeds from a method for powder-metallurgically manufacturing a rotational body, in which at least two starting bodies—referred to in the following as the first starting body and the second starting body—are each compacted from metal powder, separately from each other, placed against each other in axial contact via end faces in relation to a longitudinal axis of the rotational body, and permanently and firmly sintered to each other by collective sintering. In modifications of the method, it is also possible for only one of the starting bodies, for example the first starting body, to be compacted from the metal powder, while the other starting body is formed in another way. Forming the other starting body includes casting it from a metal-based molten mass. The other starting body can be formed directly as a cast body, i.e. formed near-net-shape by casting; it can however also be formed after casting by thermal or mechanical treatment, in particular reshaping, and as applicable mechanical machining such as for example machine-cutting. In particular, it can for example be obtained from a semi-finished product, for example a sheet-shaped or plate-shaped semi-finished product, by means of a separative process.

In accordance with an exemplary embodiment of the invention, however, the starting bodies are not compacted and/or cast from an iron-based metal powder but rather from an aluminium-based metal powder or metal molten mass. In accordance with the above, this means that at least one of the starting bodies is compacted from the aluminium-based metal powder and the other starting body is either likewise compacted from an aluminium-based metal powder or is manufactured by incorporating a casting process. The composition of the respective aluminium material is preferably the same in both starting bodies; if the aluminium materials are not the same, they are at least adapted to each other to the extent that when they are collectively sintered, a sufficiently firm sintered connection is created in the joining region between the starting bodies. The powder can in particular be a powder consisting of a single aluminium-based alloy; it can also be a powder mixture of different aluminium-based alloys or a powder which is mixed in another way but is at any rate aluminium-based. When being collectively sintered, the starting bodies are material-dependently composite-sintered at the end faces which are positioned in axial contact—in this sense, sintered to each other. The starting bodies, such as are formed powder-metallurgically by being compacted, are sintered as such when they are collectively sintered and are composite-sintered at their end faces which contact each other, such that a single body which is sintered across the end faces—a sintered composite—is obtained.

Over its entire length, the sintered composite exhibits a homogenous micro-structure in accordance with the sintering—a sintered structure—even in the joining region across the end faces which are sintered to each other, although the composite-sintered joining region can still be identified under the microscope. The composite body can thus exhibit the same micro-structure throughout, even axially across the joining region. In the joining region, locations can however also be locally present in which the starting bodies are not completely sintered to each other. The connection is however advantageously at least as firm as the usual connections in the prior art, which are only positive-fit or force-fit connections. If one of the starting bodies has been manufactured by incorporating a casting process, the above statements with regard to such a sintered composite apply only to the powder-metallurgically formed starting body and the joining region. Across the joining region, the sintered structure of one starting body transitions into the cast structure of the other starting body. The sintered connection which is produced in the region of the end faces is sufficient in order to ensure that the separately formed constituents of the sintered composite and/or rotational body are connected in a material fit which is sufficiently firm for the rotational body's use. Joining them in a radial press fit can be omitted. Compacting or otherwise forming and positioning the starting bodies which are to be sintered to each other is correspondingly simplified. It is also possible to reduce the weight, as compared for example to a rotational body made of steel. The reduction in weight is associated with a reduction in the moment of inertia. As a result, higher levels of efficiency can be achieved. The resistance to corrosion and good thermal conductivity of aluminium materials are also advantageous.

The aluminium-based powder is preferably a sintering material in terms of its composition, i.e. an aluminium sintering alloy. If the powder is a mixture of different aluminium-based alloys or a powder which is mixed in another way, then the mixture is preferably an aluminium sintering alloy in terms of its chemical composition. In preferred embodiments, the sintering material contains silicon, copper, magnesium or zinc—either only one of these elements or preferably a combination of two, three or all four elements. The sintering material can thus for example be an aluminium-silicon-copper-magnesium alloy or, as a powder mixture, can comprise a powder consisting of such an alloy. Instead of or together with silicon, the alloy can also contain zinc. It can also contain tin. Aluminium alloys consisting of the following proportions by mass in the alloy are preferred: silicon=0.5 to 16%, copper=0.5 to 5%, zinc=0 to 7.0%, magnesium=0 to 6%; even more preferably: silicon=10 to 15%, copper=1 to 3%, magnesium=0 to 1%, tin=0 to 0.5%. It also applies to these specifications that only one or each combination of these alloy partners which can be formed from the ranges can be contained in the aluminium material. An advantageous aluminium-silicon-copper-magnesium alloy can in particular exhibit a silicon content of 14%, a copper content of 3% and a magnesium content of 0.6% or a silicon content of 14%, a copper content of 2.5% and a magnesium content of 0.5%, each in relation to the overall weight of the respective alloy. The rest of the respective aluminium alloy, apart from unavoidable impurities, is made up by the element aluminium. If one of the starting bodies is not formed powder-metallurgically but rather by casting, preferably with a subsequent treatment, the above statements likewise apply, at least in relation to preferred alloy partners of the aluminium. The starting body produced from such an aluminium material can then in particular contain silicon or zinc in order to increase the sintering activity.

Since the invention does not require the starting bodies to be composite-sintered at areas which point transverse to the longitudinal axis of the rotational body, the starting bodies can be formed such that when their joining areas—i.e. the end faces—are in axial contact, they can only be moved relative to each other transverse to the longitudinal axis counter to a frictional force which acts at the end faces—in principle, in any direction pointing transverse to the longitudinal axis in fact. The end faces can simply be planar. They can however also be curved so as to fit and/or conform to each other. When positioned for collective sintering, the starting bodies can be in contact with each other even at areas which point transverse to the longitudinal axis; as mentioned, however, such contact is not required in order to perform the method in accordance with the invention, in particular in order for the connection to be firm. In particular, a press fit is not necessary in relation to a direction pointing transverse to the longitudinal axis, although such a press fit is not to be ruled out. In preferred embodiments, only planar end faces of the starting bodies at which they are sintered to each other by collective sintering contact each other when the starting bodies are positioned relative to each other.

In order to facilitate positioning, positioning elements can be formed within the end faces, i.e. at least one positioning element per starting body and preferably at least two positioning elements per starting body. The positioning element or elements of the first starting body and the positioning element or elements of the second starting body can co-operate as centring elements during positioning, in order to fix the starting bodies relative to each other transverse to the longitudinal axis. Such positioning elements can engage directly with each other, in that the positioning elements co-operate like a plug and socket. In one modification, the first starting body and also the second starting body can each comprise at least one recess, and an additional positioning element which acts as a plug can engage with both recesses. In another variant, positioning elements of the starting bodies can co-operate with one or more positioning elements of a positioning device. The first starting body and second starting body can thus for example comprise at least one bore each, which are axially aligned when the starting bodies are positioned. A positioning device can correspondingly comprise a matching positioning pin or bolt which protrudes through the bore of one starting body and into or through the assigned bore of the other starting body when the starting bodies are positioned. Such an external positioning element of a positioning device preferably does not participate in the sintering reaction. It can however also consist of a material which dissolves during the sintering process.

On the basis of the invention, the starting bodies can lie loosely one on top of the other when being collectively sintered, such that only the weight of the starting body lying on top acts when the end faces are in axial contact. A clamping tool is not necessary, although the use of such a tool is not to be ruled out. In preferred embodiments, however, the starting bodies are collectively sintered in a loose pressure contact, wherein the axial pressure force is generated only by the inherent weight of the starting body lying on top. If iron-based powders are used, composite-sintering would not be performed in these circumstances, or at any rate not with the stability necessary for a torque-transmitting connection between the starting bodies. This is due to a comparatively higher sintering activity of the aluminium material, which can be increased by adding silicon or zinc. Here, as elsewhere, the word "or" is always understood by the invention to mean "inclusive or", i.e. it covers both the meaning "either . . . or" and the meaning "and", unless only one of these two meanings can exclusively follow from the respectively specific context. In relation to the addition of silicon or zinc, this means that, of these two elements, the aluminium material can contain only silicon in a first variant, only zinc in a second variant, and both silicon and zinc in a third variant.

The invention is also in particular suitable for composite-sintering compacted starting bodies which, due to differences in shape, experience changes in shape during collective sintering, the extent of which differs to a significant degree. Differences in the change in shape of the starting bodies which are to be connected to each other are to be expected if the mass distribution of the first starting body differs from the mass distribution of the second starting body transverse to the longitudinal axis to a significant extent. This is for example the case when the first starting body is compacted as a sleeve structure comprising a sleeve wall which is thin as compared to its outer radius, at least in sections in the circumferential direction, and the second starting body is compacted as a disc-shaped structure. The second starting body can then in particular be formed as an annular disc exhibiting a radially measured annular width which is greater than the thickness of the sleeve wall of the first starting body. In such circumstances, the first starting body experiences a greater relative change in shape in the radial direction during sintering than the second starting body. The difference with regard to the change in shape is further amplified if the sleeve structure has a greater axial length than the disc structure. In the case of hollow green bodies such as for example sleeve structures and annular structures, the relative change in shape—i.e. the difference between compacted only and net-shape-sintered, also known as shrinkage—is greater, the smaller the ratio between the outer volume and inner volume of the respective hollow structure. Beyond this rather global measure of the volume ratio, it is a matter—as already mentioned—of the mass distribution in the radial direction and also of the mass distribution in the circumferential direction, wherein the specified directions relate to the longitudinal axis. Thus, the smaller the ratio between the outer and inner volume, and the greater—in particular, the more abrupt—the change in mass distribution in the radial direction or circumferential direction, the greater the relative change in shape during sintering.

A sintered composite which is manufactured from starting bodies of the type explained is also as such a subject of the invention. Such a sintered composite can in particular comprise one axial portion which is axially flat in the shape of a disc and is obtained from the second starting body by collective sintering, and another axial portion which is to be placed onto said portion and is obtained from the first starting body by collective sintering and is axially longer than the disc-shaped axial portion and is radially thinner over its circumference, at least in sections, than the disc-shaped axial portion. The axial division is preferably such that the first starting body forms only said sleeve structure, and the second starting body forms only the disc structure. If one of the starting bodies is not obtained by compacting but rather by casting, optionally with subsequent treatment or machining, then it is preferably the second starting body, which forms the axial portion which is flat in the shape of a disc. This starting body can advantageously be obtained from an aluminium sheet or as applicable a thicker plate-shaped or disc-shaped aluminium semi-finished product. In principle, however, it is instead also possible for the other starting body to be obtained from such a semi-finished product or to be provided directly as a cast body.

In preferred embodiments, the axial portions of the sintered composite which are respectively obtained from the starting bodies each exhibit an at least substantially constant cross-section over their axial length, i.e. as viewed over their respective axial length, they do not exhibit any variation in cross-section which would be relevant to compacting or sintering. Such a cylindrical shape simplifies compacting the respective starting body, which can be formed axially, i.e. in the compacting direction, without jumps in diameter. Cross-sections which do not vary axially also enable the changes in shape which occur in powder-metallurgically formed starting bodies during collective sintering to be more easily handled. Positioning elements, for example lugs and—for positioning—recesses which co-operate with them, are however an exception to the constant cross-section, if one of the starting bodies is at all formed with a projecting or intruding positioning element.

In order to reduce changes in shape caused by sintering, starting bodies which are compacted from powder can be pre-sintered below a sintering temperature which is necessary for the actual sintering. The sintering temperature of sintering aluminium materials is in the range of 500° C. to 650° C. and is set so as to conform to the sintering material which is specifically chosen. Optional pre-sintering is performed at a correspondingly lower temperature, expediently at a pre-sintering temperature which is chosen from the range of 300° C. to 500° C. in accordance with the sintering material. By pre-sintering, the starting bodies can be dewaxed. Pre-sintering can also be performed only for the purpose of dewaxing. A certain densification is associated with pre-sintering, since the powder particles are even then bonded to each other to a certain extent.

The first or second starting body, once removed and/or ejected from the powder press, can be mechanically machined and then positioned for collective sintering. Between being mechanically machined and collectively sintered, the starting bodies or preferably only one of the respective starting bodies of the sintered composite to be created can be pre-sintered as described above. In one method variant, mechanical machining is performed on the pre-sintered starting body, additionally or preferably only after the optional pre-sintering. The first or second starting body can be individually calibrated after pre-sintering, before or as applicable after an optional mechanical machining process. The individual starting body or the sintered composite can be subjected to one or more mechanical machining process(es), for example machine-cutting or machine-grinding, in order for example to drill one or more holes, create a particularly smooth surface or create one or more functional element(s) on the individual starting body, preferably the pre-sintered starting body, or on the sintered composite.

In preferred embodiments, in which the first and the second starting body are compacted from powder and the relative change in shape of one of the starting bodies is greater, due to its shape, than the other, only said starting body is respectively pre-sintered, while the other starting body, once compacted, is subjected to collective sintering without pre-sintering. In the cases discussed above, in which the first starting body would experience the greatest relative change in shape when sintered directly from being compacted, preferably only the first starting body of each sintered composite is respectively pre-sintered.

With respect to the sintered composite itself, the invention is in particular directed to a sintered composite which comprises a hollow wheel comprising at least one wing, and a drive disc which is placed axially onto the hollow wheel and non-rotationally connected to the hollow wheel. The first starting body can form the hollow wheel in the sintered composite, and the second starting body can form the drive disc. The hollow wheel can in particular be formed as the sleeve structure explained above, and the drive disc can in particular be formed as the aforementioned disc structure. The hollow wheel and the drive disc are compacted separately from each other, preferably each from an aluminium-based metal powder, preferably of the type described, and non-rotationally connected to each other by collective sintering in the manner explained, such that when the sintered composite is in use, torques which are introduced into the drive disc are transmitted onto the hollow wheel via the sintered connection. The hollow wheel comprises a wall which extends around the longitudinal axis cited with respect to the rotational body, and the at least one wing which protrudes transverse to the longitudinal axis, preferably inwards, from the wall. Expediently, a plurality of such wings protrude from the wall of the hollow wheel, wherein the plurality of wings are preferably arranged in a uniform distribution about the longitudinal axis, as viewed over the circumference.

In a machine or machine component which comprises the sintered composite, the drive disc can serve as a belt disc in a belt drive, either as a frictional belt disc or preferably as a toothed belt disc, as a chain wheel of a chain drive or as a toothed wheel of a toothed wheel gear system, in particular a spur wheel gear system. In preferred embodiments, the drive disc comprises a toothing, preferably an outer toothing, circumferentially about the longitudinal axis.

A sintered composite of the type in accordance with the invention can be used as a stator for manufacturing a swing-wing adjuster, i.e. a vane-type adjuster, for adjusting the rotational angular position of a valve control shaft, for example a cam shaft, relative to a crankshaft of an internal combustion engine. "Stator" refers to the part of the swing-wing adjuster which is driven in a fixed rotational angular relationship to the crankshaft and outputs onto the valve control shaft via a rotor of the swing-wing adjuster. The rotor can be rotated back and forth about the longitudinal axis relative to the stator within a limited pivoting angle and thus the rotational angular position of the valve control shaft relative to the crankshaft can be adjusted. The stator can be mechanically coupled to the crankshaft by means of its drive disc, in particular by a chain drive or a toothed wheel drive. Swing-wing adjusters such as the invention relates to are described for example in DE 10 2007 020 431 B and DE 10 2009 024 482. The stators of the known swing-wing adjusters are assembled from a plurality of separately formed parts which are connected to each other in a positive fit or in a force fit or by welding in a material fit. While the joined parts of such stators are individually also already manufactured powder-metallurgically, they have however hitherto been conventionally joined, for example by press-connecting, screw-connecting or welding. Combining the functions of a drive disc which can be driven from an external source, for example a crankshaft, and a vane and/or winged hollow wheel which outputs internally in relation to the swing-wing adjuster, even as they are powder-metallurgically manufactured, does not however follow from the prior art.

BRIEF DESCRIPTION OF THE DRAWINGS

Example embodiments of the invention are explained below on the basis of figures. Features disclosed by the example embodiments, each individually and in any combination, advantageously develop the subjects of the claims and the embodiments explained above. There is shown:

DETAILED DESCRIPTION OF THE INVENTION

Figure 1:
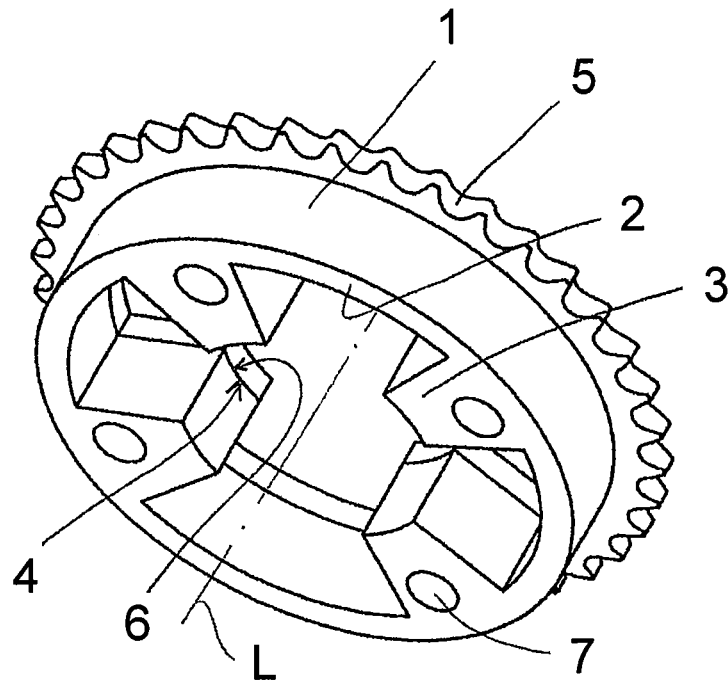
FIG. 1 a sintered composite of a first example embodiment, in a perspective view.
Figure 2:
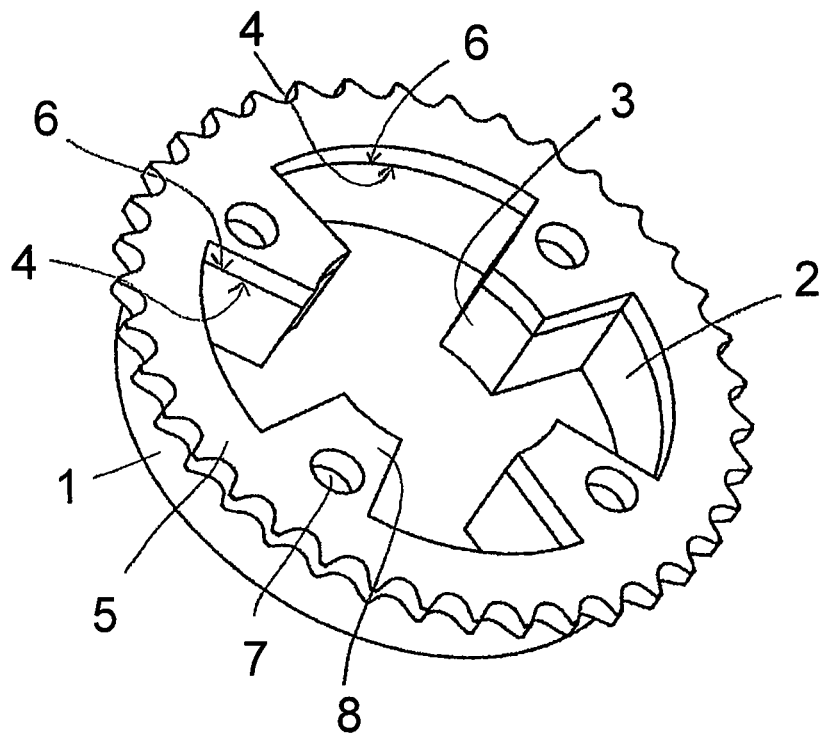
FIG. 2 the sintered composite of the first example embodiment, in a different perspective view.

FIG. 1 shows a rotational body of a first example embodiment in a perspective view onto one of the two axial end-facing sides of the rotational body, and FIG. 2 shows the same rotational body in a perspective view onto the opposite end-facing side. The rotational body is a powder-metallurgically manufactured composite body, i.e. a sintered composite. It comprises two axial portions 1 and 5 which are formed separately from each other and are sintered onto each other via mutually facing end-facing sides 4 and 6, i.e. sintered to each other. The composite-sintered end faces 4 and 6 form an internal joining region of the rotational body.

The first axial portion forms a hollow wheel 1 comprising a hollow wheel wall 2 which encircles a central longitudinal axis L, and a plurality of jaws or wings 3 which protrude inwards from the hollow wheel wall 2 towards the central longitudinal axis L. The wings 3 are arranged in the circumferential direction in a distribution, for example at equal angular distances, about the longitudinal axis L. Between wings 3 which are adjacent in the circumferential direction, the hollow wheel wall 2 exhibits a small thickness, as measured in the radial direction, as compared to an outer diameter of the hollow wheel wall 2; the outer diameter of the hollow wheel wall 2 is for example many times larger than its thickness.

The second axial portion 5 is a disc structure into which an external torque can be introduced for rotationally driving the rotational body and which is therefore also referred to in the following as the drive disc 5. The drive disc 5 is for example a chain wheel. The vane or hollow wheel 1 and the drive disc 5 are sintered to each other and therefore permanently and firmly connected in a material fit at the end faces 4 and 6 which are internal to the sintered composite 1, 5, at the end face 4 of the hollow wheel 1 and at the end face 6 of the drive disc 5 which faces axially opposite. This sintered connection which exists over the end faces 4 and 6 preferably exists uniformly over the entire circumference of the sintered composite 1, 5. It advantageously exists both in the circumferential portions in which the wings 3 are formed and in the intermediate portions in which the hollow wheel 1 exhibits only its comparatively thin hollow wheel wall 2. The hollow wheel 1 and the drive disc 5 are uniformly sintered to each other throughout, both over their entire circumference and in the radial direction in their axial contact, which provides a joining area which is as large as possible in accordance with the geometry of these components. In modifications, planar regions in which the hollow wheel 1 and the drive disc 5 are not sintered to each other could also be formed within the areas placed against each other. Sintering over as large an area as possible within the limits predetermined by the geometries is however advantageous for transmitting torque.

The drive disc 5 is formed over its inner circumference so as to conform to the inner circumference of the hollow wheel 1; the hollow wheel 1 and the drive disc 5 exhibit the same inner contour, i.e., the drive disc 5 comprises protrusions 8 which protrude radially inwardly and overlap with the wings 3 in the composite body. Over its entire circumference, the drive disc 5 protrudes outwards beyond the hollow wheel 1 and circumferentially comprises an outer toothing in the protruding region.

The drive disc 5 is at least substantially an axially flat disc exhibiting the same cross-section at least substantially over its entire axial extent. The drive disc 5 is an annular disc comprising the annular portions which are adapted to the contour of the wings 3 and, between them in the circumferential direction, circular portions which remain free. The hollow wheel 1 exhibits a greater axial extent than the drive disc 5; it is formed as an axially short sleeve structure. The outer contour forms a circle around the longitudinal axis L. The inner contour is composed of the contour of the wings 3 and circular portions lying between them. The hollow wheel 1 likewise exhibits the same cross-section in the longitudinal direction at least substantially throughout. The wings 3 and the circumferential portions of the drive disc 5 which overlap them are penetrated by axial bores 7 which serve for assembling the rotational body.

In order to manufacture the sintered composite 1, 5, the hollow wheel 1 and the drive disc 5 are each separately compacted from a metal powder in a powder press. The metal powder is a sintering aluminium, for example a powdered sintering aluminium alloy or a powder mixture which corresponds in its overall composition to a sintering aluminium alloy. The near-net-shape starting bodies or compacts obtained by compacting and optionally pre-sintered after compacting, i.e. a first starting body 1 corresponding to the hollow wheel 1 and a second starting body 5 corresponding to the drive disc 5, are placed against each other via their end faces 4 and 6 which are still free at this time, as can be seen from FIGS. 1 and 2 for the composite 1, 5, and are collectively sintered while placed against each other at a suitably chosen sintering temperature $T_S$, such that they are uniformly sintered to each other throughout over the end faces 4 and 6 placed against each other in their axial contact. The bores 7 can be worked into the sintered composite 1, 5 thus obtained, or are preferably formed in the starting bodies 1 and 5, in particular even as the starting bodies 1 and 5 are compacted.

Forming the bores 7 even as the starting bodies 1 and 5 are formed has the advantage that the bores 7 can serve to position and loosely fix the starting bodies 1 and 5 when they are placed against each other for collective sintering, by inserting an alignment pin or bolt, which serves as a positioning element, through one or each of the preferably multiple bores 7. A positioning device which serves a positioning function for sintering can then for example comprise such positioning elements, and the starting bodies 1 and 5 to be sintered to each other can be slid onto the positioning element or elements of the positioning device via their bores 7. Instead of or in addition to using such bores 7 as positioning elements, at least one positioning element can be respectively created, i.e. at least one positioning element of the hollow wheel 1 and at least one positioning counter element of the drive disc 5 can be created, on the end faces 4 and 6 when the starting bodies 1 and 5 are compacted or by an optional mechanical machining process. One of the positioning elements which co-operate during joining can be a recess, and the other can be a corresponding projection. The positioning element and its positioning counter element can however also both be formed as recesses, and an additional positioning element can be employed which, when positioned, engages with the recesses which lie axially opposite each other. Such an additional positioning element is preferably formed from a material which sinters to the hollow wheel starting body 1 and the drive disc starting body 5 when collectively sintered. Such an additional positioning element is preferably likewise produced from an aluminium-based material.

Figure 3:
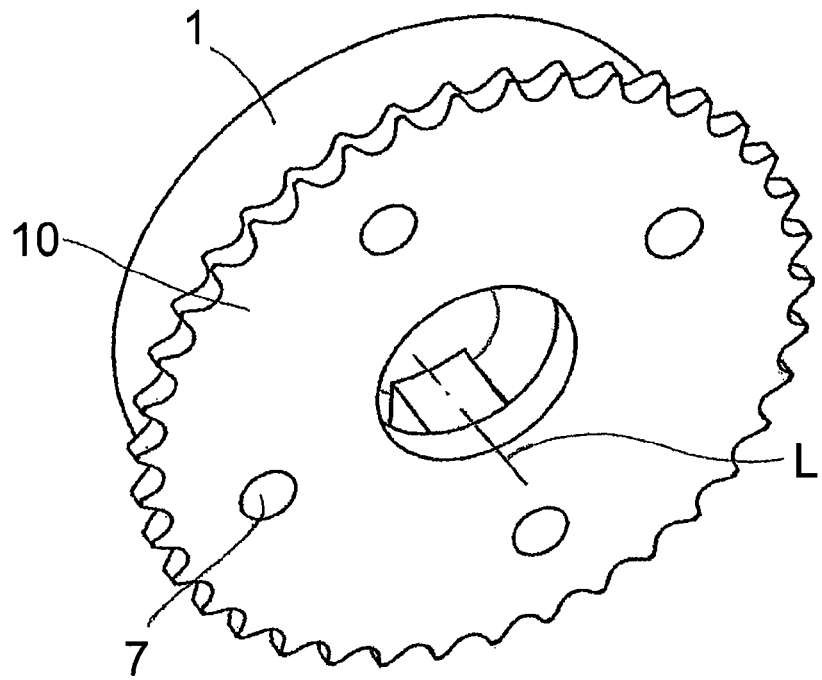
FIG. 3 a sintered composite of a second example embodiment, in a perspective view.
Figure 4:
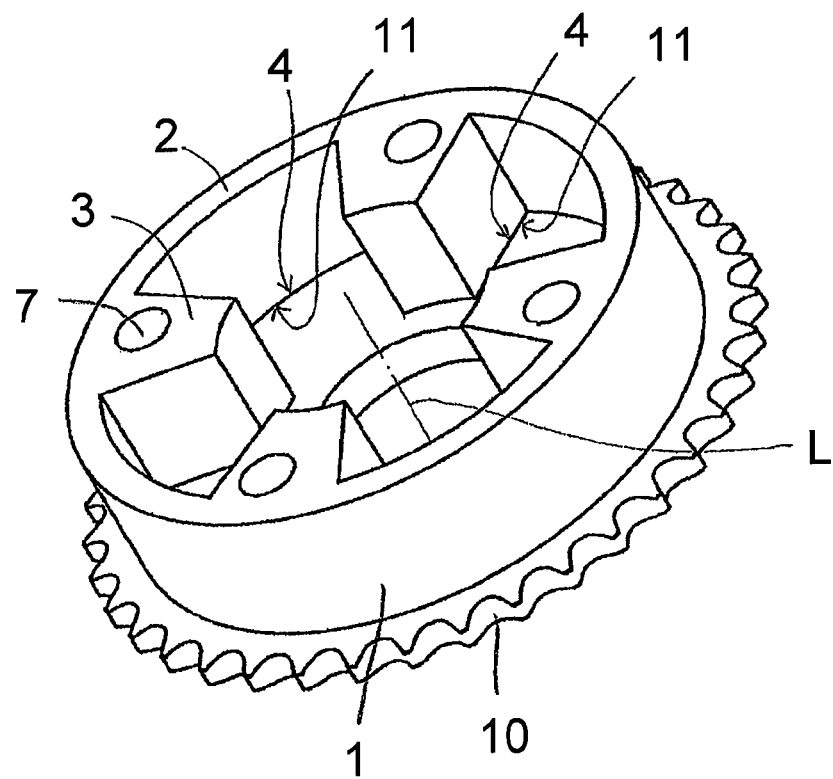
FIG. 4 the sintered composite of the second example embodiment, in a different perspective view.

FIGS. 3 and 4 show a rotational body of a second example embodiment which is likewise formed as a sintered composite from a hollow wheel 1 and a drive disc 10. The hollow wheel 1 corresponds to that of the first example embodiment. The drive disc 10 corresponds broadly to the drive disc 5 of the first example embodiment, but differs from it with regard to its radially inner region. While the inner contour of the drive disc 5 is formed so as to conform to the inner contour of the hollow wheel 1, the drive disc 10 forms a sort of cover or base of the rotational body of the second example embodiment. Due to this difference in shape, the rotational body of the second example embodiment substantially exhibits the shape of a cup, comprising a cup base formed by the drive disc 10 and a cup wall which is formed by the hollow wheel 1 and projects axially from the cup base. The drive disc 10 extends radially inwards, towards the central longitudinal axis L, beyond the hollow wheel wall 2, for example also beyond the wings 3, as viewed over its entire circumference. A central round passage bore remains in the centre of the drive disc 10, i.e. its inner contour is for example circular. Aside from the differences which have been mentioned with respect to the shape of the drive disc 10 and can be seen from the figures, the rotational body of the second example embodiment corresponds to that of the first example embodiment in all respects, in particular with regard to the sintering material and the sintered connection at the end faces 4 and 11 which axially contact each other during collective sintering, wherein the end face 11 only differs from the end face 6 of the first example embodiment radially inwards outside the sintering region. The actual joining areas are the same as in the first example embodiment.

Figure 5:
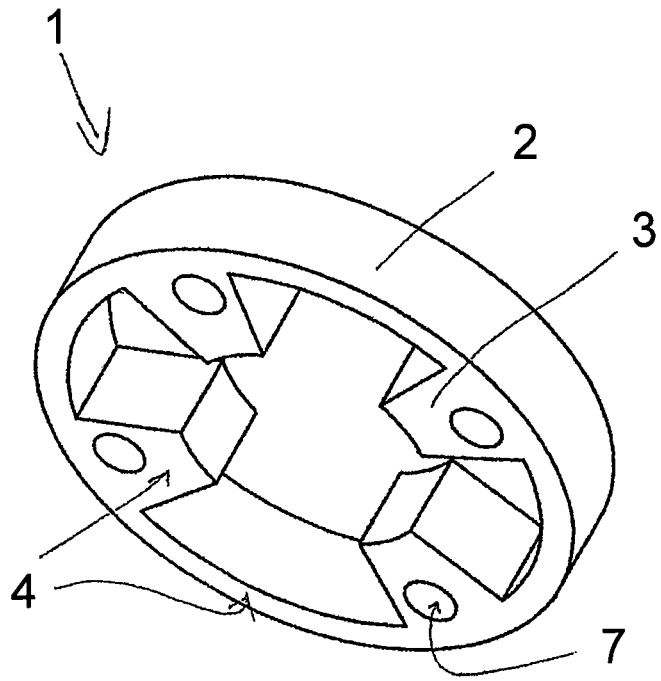
FIG. 5 a first starting body, formed for the sintered composite of the first example embodiment by compacting.
Figure 6:
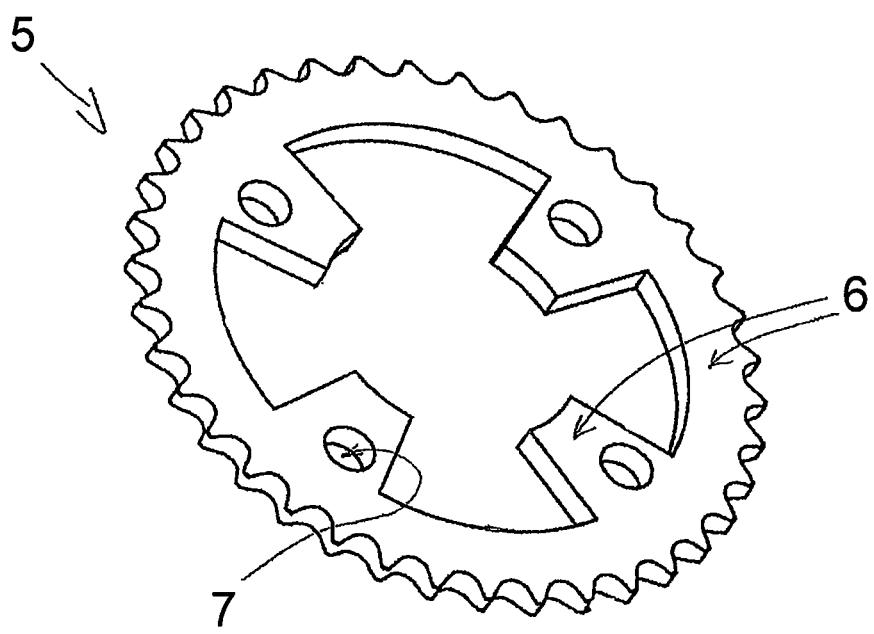
FIG. 6 a second starting body, formed for the sintered composite of the first example embodiment by compacting.

FIGS. 5 and 6 show the starting bodies 1 and 5 after they have been compacted, but individually, i.e. before they have been joined. The starting bodies 1 and 5 are each compacted in a shape such that after collective sintering and the associated shrinkage, they correspond to the net shape of the sintered composite 1, 5 to be created. The starting bodies 1 and 5 are preferably compacted into the shape which can be seen from FIGS. 5 and 6 from the same sintering material, namely a sintering aluminium powder. Once removed from the mould and from the respective compacting tool, they can be mechanically machine-finished, for example in order to remove a pressing skin created during compacting.

The starting bodies 1 and 5 are positioned relative to each other for collective sintering, such that they are placed axially against each other via their end faces 4 and 6, i.e. their joining areas. The end faces 4 and 6 are planar joining areas which point radially with respect to the longitudinal axis L of the respective starting body 1 or 5. These joining areas 4 and 6 are breached only by the passage bores 7. While they are placed against each other, one of the starting bodies 1 and 5 can in particular lie on top of the other of the starting bodies 1 and 5, in particular due to the effect of gravity, i.e. its own weight.

The starting bodies 1 and 5, with their end faces 4 and 6 placed against each other, are collectively sintered in a sintering furnace at a sintering temperature $T_S$. The sintering temperature $T_S$ is chosen in accordance with the sintering material and is within the range of 500° C. to 650° C. in the case of the sintering material used in accordance with the invention, i.e. sintering aluminium, wherein the starting bodies 1 and 5 sinter uniformly over the end-facing contact areas and/or joining areas 4 and 6 and form the internal joining region of the sintered composite 1, 5 thus obtained. Due to the sintering material chosen, it is sufficient if the starting bodies 1 and 5 are in a loose pressure contact during sintering, wherein one starting body 1 or 5 lying on top is placed against the other or more specifically lies on top of the other due to its inherent weight.

A positioning device can be used to position the starting bodies 1 and 5 relative to each other for sintering. The pairs which are to be sintered to each other, each consisting of a starting body 1 and a starting body 5, can lie on an upper side of the positioning device, wherein positioning elements which project from the upper side of the positioning device protrude into the bores 7 of both starting bodies 1 and 5 and thus position the starting bodies 1 and 5 relative to each other. If the bores 7 are not present, or also as applicable additionally, positioning lugs and positioning recesses can be formed on the end faces 4 and 6 and by co-operating directly can position the starting bodies 1 and 5 relative to each other. Expediently, each of the starting bodies 1 and 5 comprises at least two such positioning elements. Instead of directly co-operating positioning elements, it is also possible for at least one positioning recess to be respectively formed in each of the end faces 4 and 6 and for an additional positioning element to engage with said positioning recesses, for positioning.

The starting body 5 which forms the drive disc 5 in the sintered composite 1, 5 is geometrically more compact than the starting body 1, in particular due to the comparatively thin sleeve wall or hollow wheel wall 2 between the wings 3. The starting body 1 exhibits a more uneven mass distribution in the radial direction and also in the circumferential direction than the starting body 5. Due to these differences in shape, it is to be expected that the starting body 1 will experience a greater relative change in shape than the starting body 5 during collective sintering if the compacted and optionally mechanically machine-finished starting bodies 1 and 5 are sintered at the sintering temperature $T_S$. The relative change in shape or shrinkage is understood to mean the difference in the shape of the respective starting body 1 and 5 between compacted only and net-shape-sintered.

In one method variant, the starting body 1 is pre-sintered at a temperature below the sintering temperature $T_S$, before collective sintering. The pre-sintering temperature is chosen from the range of 300° C. to 500° C., in accordance with the sintering material. Pre-sintering advantageously also dew-axes the starting body 1. In the method variant, the pairs of starting bodies 1 and 5 which are to be sintered to each other, i.e. in each case a pre-sintered starting body 1 and a starting body 5 which is still provided with the compacted structure, are placed against each other, collectively sintered and thus sintered to each other over the end faces 4 and 6 placed against each other, as described above for the basic variant. The starting body 1 can be individually calibrated after pre-sintering. In one modification, the starting body 5 can be pre-sintered as described above and, once pre-sintered, optionally calibrated. The pre-sintered starting body 1 or 5 can also be individually machined in another way, before or after an optional individual calibration, if mechanical machining is necessary.

In another method variant, the starting body 1 and/or the starting body 5 can be individually net-shape-sintered before collective sintering at the sintering temperature $T_S$, i.e. the respective starting body 1 or 5 no longer participates in collective sintering as a compact which has been compacted only or optionally pre-sintered but rather as a finished sintered starting body.

After collective sintering, the sintered composite 1, 5—i.e. the axial portions 1 and 5 which have been obtained from the starting bodies 1 and 5 and respectively sintered in their own right and sintered to each other—can be machine-finished or further processed if machine-finishing or further processing is necessary.

The manufacture of the sintered composite 1, 10 of the second example embodiment corresponds to that of the first example embodiment, both when implementing the basic variant and in the method variants with pre-sintered or net-shape-sintered starting bodies 1 or pre-sintered or net-shape-sintered starting bodies 10.

Figure 7:
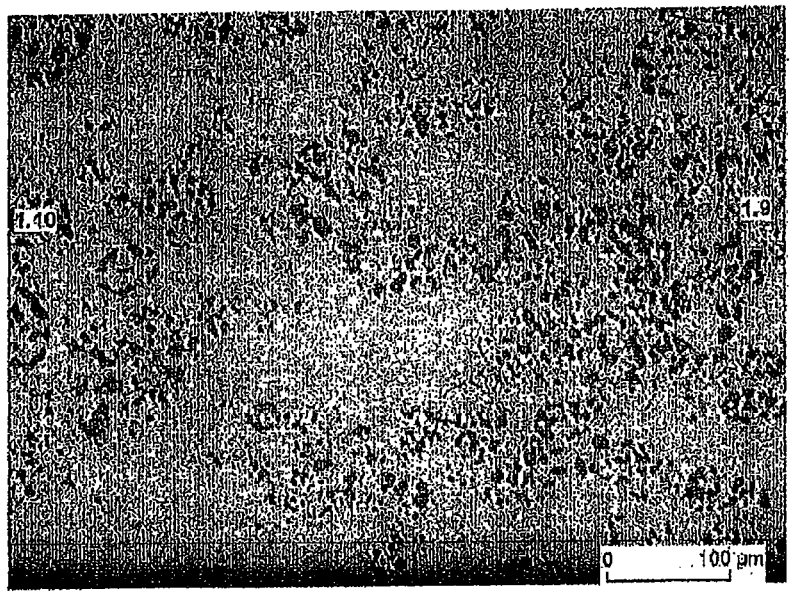
FIG. 7 a first structural region of a sintered composite in accordance with the invention.
Figure 8:
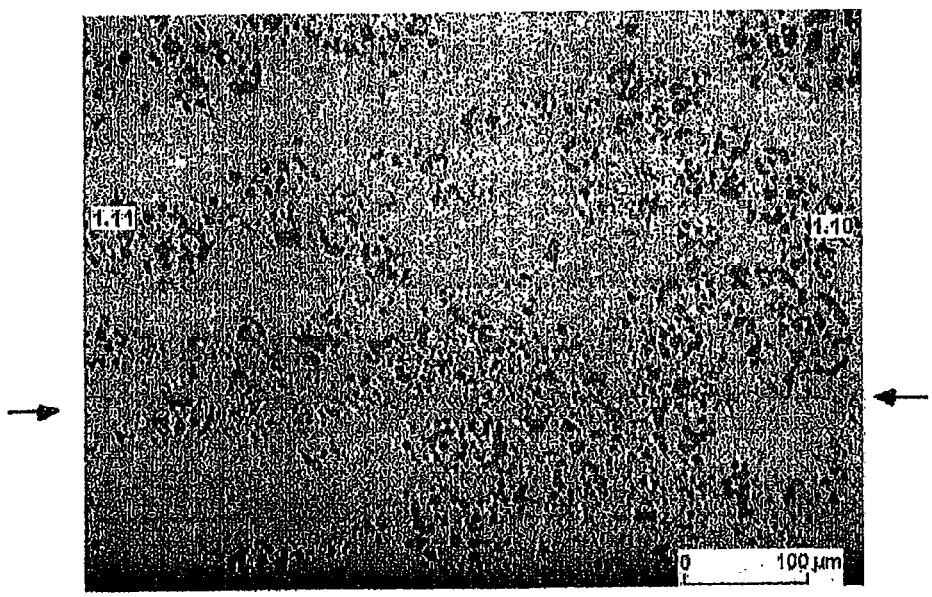
FIG. 8 a second structural region of the sintered composite of FIG. 7.

FIGS. 7 and 8 are longitudinal micrographs which show the micro-structure of the sintered composite of the first example embodiment in the joining region at locations of the sintered composite which differ in the radial direction. In the recording region of FIG. 7, the joining region cannot be seen in the magnification shown; in this partial region, the sintered composite exhibits a uniform sintered structure across the joining region throughout. In the partial region of the joining region shown in FIG. 8, the joining region can be seen at some locations and is identified by side arrows. Sintering did however also occur in this partial region; locations with incomplete sintering remain only locally, which however can be tolerated with regard to the stability of the sintered composite and with regard to its fatigue resistance. If the two starting bodies 1 and 5 were not sintered to each other but rather for example screwed to each other in a conventional way, the connection would also not be the same over the entire joining region throughout but would rather exhibit locations with greater and lesser stability. Experiments yielded a comparable micro-structure for the sintered composite of the second example embodiment.

Figure 9:
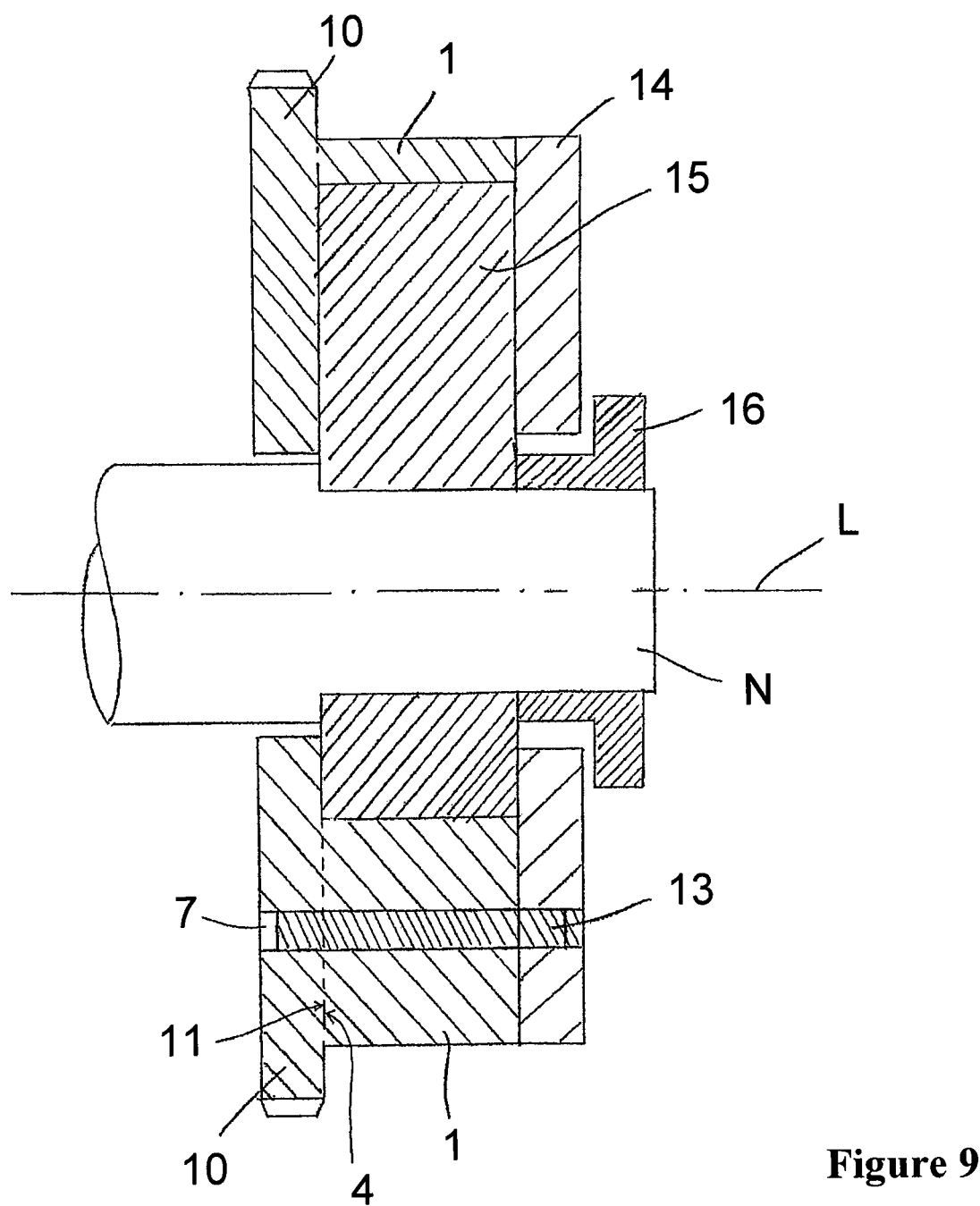
FIG. 9 a swing-wing adjuster comprising the sintered composite of the second example embodiment.

FIG. 9 shows a cam shaft N of an internal combustion engine, comprising a swing-wing adjuster which is assembled on the cam shaft N at one axial end. The cam shaft N serves to control valves of the internal combustion engine in a known way. The swing-wing adjuster comprises a stator which is rotary-driven in a fixed rotational angular relationship by a crankshaft of the internal combustion engine, and a rotor 15 which is connected rotationally fixed to the cam shaft N by means of a fastening element 16 and is coupled to the stator in order to be collectively rotary-driven. Within the coupling, the rotor 15 can be rotated back and forth relative to the stator about its common longitudinal axis L with the cam shaft N over a limited rotational angular range. The rotational angular position of the cam shaft N can be adjusted relative to the rotational angular position of the crankshaft in accordance with this rotational angular range.

The stator comprises the sintered composite 1, 10 and/or rotational body 1, 10 of the second example embodiment, and a cover 14 which is connected non-rotationally to the sintered composite 1, 10 by means of a plurality of fastening elements 13, for example in a screw connection. The fastening elements 13 protrude through the bores 7 and through bore continuations which are correspondingly formed on the cover 14.

The rotor 15 comprises wings which are distributed about the longitudinal axis L of the cam shaft N, co-operate with the wings 3 of the sintered composite 1, 10, and project outwards from a central region of the rotor 15. The stator 1, 10, 14 forms a fluid-tight housing for the rotor 15. Pressure fluid chambers are formed in a known way between the stator 1, 10, 14 and the rotor 15 and are actuated, in a way which is likewise known, in order to set the relative rotational angular position between the stator 1, 10, 14 and the rotor 15 and consequently the rotational angular position between the crankshaft and the cam shaft N in accordance with the operational state of the internal combustion engine.

The end faces 4 and 11 which were present before composite-sintering and now form the joining region of the integral sintered composite 1, 10 are indicated for the sintered composite 1, 10 by a dashed line. As mentioned, the drive disc 10 of the sintered composite 1, 10 forms one of the two housing covers of the stator 1, 10, 14, thus enabling the number of parts which have to be connected to each other to form the stator to be reduced.

Figure 10:
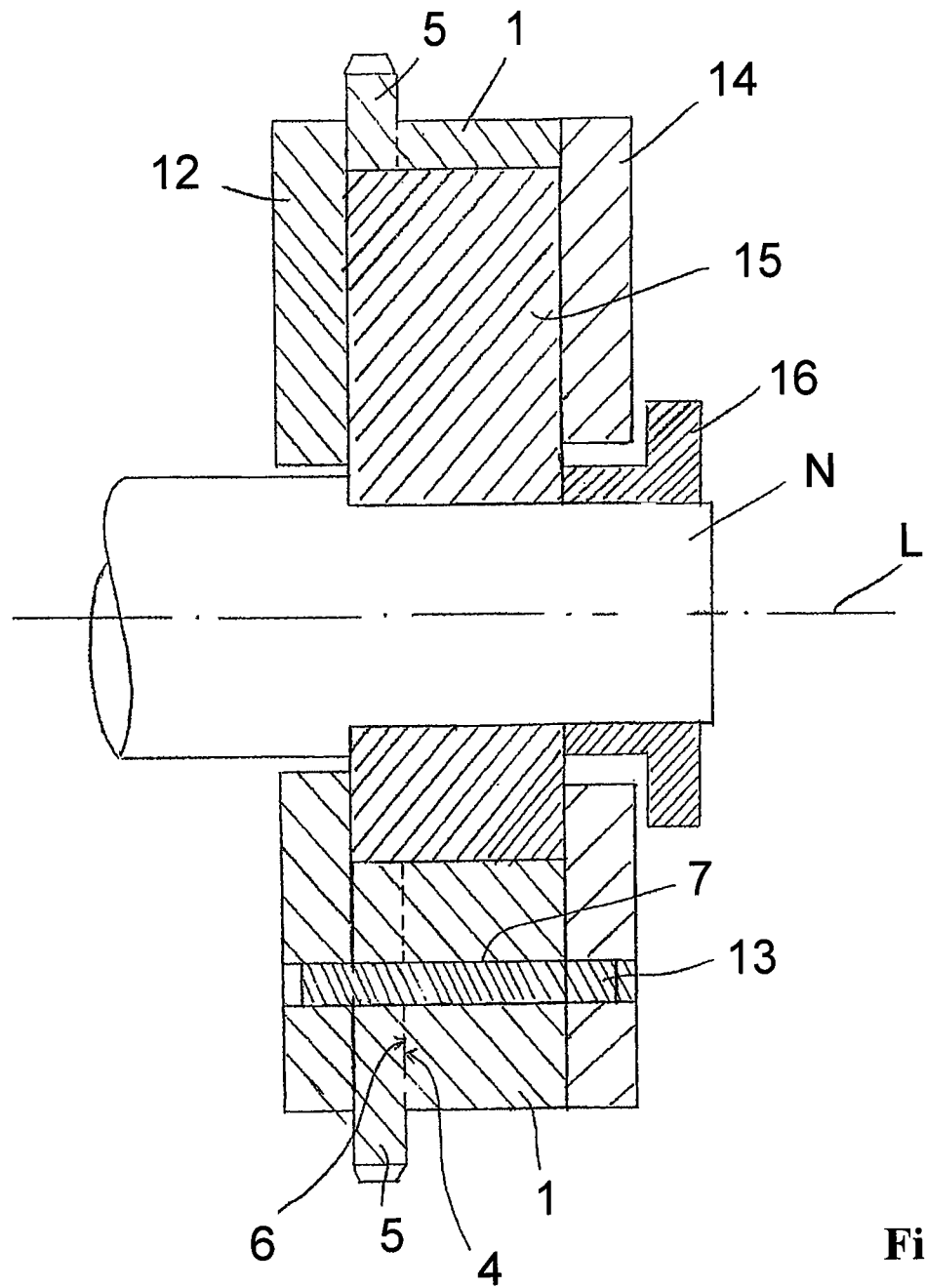
FIG. 10 a swing-wing adjuster comprising the sintered composite of the first example embodiment.

FIG. 10 shows a cam shaft N comprising a swing-wing adjuster in which the stator is formed using the sintered composite 1, 5 of the first example embodiment. Due to the shape of the drive disc 5, the sintered composite 1, 5 only forms a middle part of the adjuster housing which surrounds the rotor 15 at the outer circumference. In order to complete the housing formed by the stator, an additional cover 12 is therefore necessary which is arranged on the other side of the rotor 15, axially opposite the cover 14. The two covers 12 and 14 are connected rotationally fixed and fluid-tight to each other via the sintered composite 1, 5 arranged axially between them, by means of fastening elements 13 as in the example embodiment of FIG. 9, for example screw elements, which protrude through the bores 7 of the sintered composite 1, 5 and respectively protrude into bore continuations in the covers 12 and 14, in order to tense the two covers 12 and 14 axially against the sintered composite 1, 5. The former end faces 4 and 6 of the internal joining region are also indicated for the sintered composite 1, 5 by a dashed line. However, the sintered composite 1, 5 is in fact integral, as described.

The following table includes aluminium alloys with which experiments have been successfully conducted. The alloys are examples and are to be understood as being merely representative of others. Only the alloy partners of the aluminium are specified. Aluminium makes up the rest of each of the alloys. Alloys 1 to 3 each contain silicon, not least also due to the increase in sintering activity for being sintered, while Alloy 4 contains zinc instead. Zinc and silicon can also be joint constituents of usable aluminium-based materials.

|  | Alloy 1 [% by mass] | Alloy 2 [% by mass] | Alloy 3 [% by mass] | Alloy 4 [% by mass] |
|---|---|---|---|---|
| Silicon | 9.0-12.0 | 14.0-16.0 | 0.5-0.8 | — |
| Copper | 1.5-2.0 | 2.4-2.8 | 4.3-4.7 | 1.5-2.0 |
| Magnesium | 0.3-0.6 | 0.6-0.8 | 0.4-0.6 | 2.2-2.8 |
| Zinc | — | — | — | 6.0-7.0 |
| Tin | — | — | — | 0.1-0.3 |

The following matrix summarises combinations of starting bodies, for example starting bodies 1 and 5 or starting bodies 1 and 10, which can be sintered to each other to form the sintered composite. Preferred combinations are highlighted by crosses. The combinations not provided with a cross are, however, likewise within the subject of the invention. As can be gathered from the matrix, not only compacts which are compacted only or pre-sintered can be sintered to each other in accordance with the invention but also for example a compact which has been compacted only and as applicable individually machined and a net-shape-sintered starting body, as applicable a mechanically machined starting body, or also a compact which has been compacted only or pre-sintered, together with a starting body made of an aluminium material and not manufactured powder-metallurgically. Such an aluminium part which has not been manufactured powder-metallurgically can for example be a metal sheet part or cast part made of an aluminium material. Experiments have then shown that a starting body which is compacted only, a pre-sintered starting body or also a net-shape-sintered starting body and a metal sheet part, each made of an aluminium material, can be sintered to each other to a sufficient quality. Sintering compacts which had compacted only, pre-sintered compacts and net-shape-sintered starting bodies respectively with a cast part made of an aluminium material likewise resulted in sintered composites exhibiting sufficient stability. Where a respective starting body is specified as being "machined", this can mean mechanical machining, for example drilling, milling or other machine-cutting or separative machining, or secondary compacting, calibrating or heat-treating, or equally a combination of two or more of these machining processes. Calibration is preferably only performed on pre-sintered or net-shape-sintered starting bodies.

|  | starting body | | | | | | |
|---|---|---|---|---|---|---|---|
| starting body | compacted | compacted and machined | pre-sintered | pre-sintered and machined | net-shape-sintered | net-shape-sintered and machined | non-powder-metallurgically manufactured, e.g. a cast body or metal sheet |
| compacted | x | x | x | x | x | x | x |
| compacted and machined | x |  |  | x |  |  |  |
| pre-sintered | x |  |  | x |  |  |  |
| pre-sintered and machined | x | x | x | x | x | x | x |
| net-shape-sintered | x |  |  | x |  |  |  |
| net-shape-sintered and machined | x |  |  | x |  |  |  |
| non-powder-metallurgically manufactured, e.g. a cast body or metal sheet | x |  |  | x |  |  |  |

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A method for powder-metallurgically manufacturing a rotational body, the method comprising:
   a) compacting a first starting body from metal powder;
   b) forming a second starting body from metal, separately from the first starting body;
   c) placing the starting bodies against each other in axial contact via end faces in relation to a longitudinal axis of the rotational body; and
   d) permanently and firmly sintering the first starting body and the second starting body to each other by collective sintering,
   e) wherein the first starting body is compacted from an aluminium-based powder and the second starting body is formed from an aluminium material,
   f) and the starting bodies are sintered to each other at their respective end faces,
   g) wherein the first starting body is sintered as such during the collective sintering, and
   h) one of the starting bodies is placed onto the other for the collective sintering and presses against the other of the starting bodies with its own weight only, during sintering.

2. The method according to claim 1, wherein the second starting body is compacted from an aluminium-based powder, or is obtained directly as a cast body by casting an aluminium-based molten mass or by a thermal or mechanical treatment performed after casting or by machining, wherein the aluminium material of the first starting body and the aluminium material of the second starting body are chosen in accordance with each other for being fused by sintering.

3. The method according to claim 1, wherein the second starting body is compacted from an aluminium-based powder and the aluminium material of the first starting body and the aluminium material of the second starting body are chosen in accordance with each other for being fused by sintering.

4. The method according to claim 1, wherein the first starting body is compacted as a sleeve structure comprising a sleeve wall which extends around the longitudinal axis and is thin as compared to an outer radius of the sleeve wall, and the second starting body is compacted as a disc structure or is formed by incorporating a casting process, or wherein the first starting body is compacted as the disc structure and the second starting body is compacted, or formed by incorporating a casting process, as the sleeve structure.

5. The method according to claim 4, wherein the first starting body is compacted with at least one wing which protrudes inwards or outwards from the sleeve wall of the sleeve structure or a ring of the disc structure.

6. The method according to claim 1, wherein in order to manufacture a vane with a drive disc axially placed on it, the first starting body is compacted as the vane with at least one wing which protrudes inwards or outwards, and the second starting body is compacted, or formed by incorporating a casting process, as the drive disc, or wherein the first starting body is compacted as the drive disc and the second starting body is compacted, or formed by incorporating a casting process, as the vane.

7. The method according to claim 1, wherein the starting bodies are only sintered to each other at their end faces.

8. The method according to claim 1, wherein the end faces are planar.

9. The method according to claim 1, wherein at least one of the starting bodies is pre-sintered, below a sintering temperature necessary for sintering.

10. The method according to claim 9, wherein the at least one of the starting bodies is dewaxed during pre-sintering.

11. The method according to claim 9, wherein only one of the starting bodies is pre-sintered.

12. The method according to claim 1, wherein a pressing skin present after compacting is removed from at least one of the starting bodies before they are placed against each other.

13. The method according to claim 1, wherein at least one of the starting bodies is calibrated before collective sintering.

14. The method according to claim 1, wherein both the first starting body and the second starting body are calibrated before collective sintering.

15. The method according to claim 1, wherein the starting bodies are each formed with at least one positioning element and are positioned relative to each other when placed against each other by means of the co-operating positioning elements, wherein during positioning, the at least one positioning element of the first starting body and the at least one positioning element of the second starting body are moved into an engagement, which positions the starting bodies relative to each other, with each other directly or with a positioning element of an external positioning device or an inserted positioning element which is internal to the sintered composite.

16. The method according to claim 1, wherein the starting bodies are each formed with at least one axial bore and placed against each other for collective sintering such that the at least one bore of the first starting body and the at least one bore of the second starting body are axially aligned and feed into each other, wherein when the starting bodies are placed against each other.

17. The method according to claim 16, wherein the bores are used as positioning elements for placing them against each other in an exact position, by moving the bores into exact axial alignment or holding them in exact axial alignment when the starting bodies are placed against each other, by inserting a positioning element which extends axially.

* * * * *